United States Patent [19]
Coward et al.

[11] Patent Number: 5,363,213
[45] Date of Patent: Nov. 8, 1994

[54] UNQUANTIZED RESOLUTION CONVERSION OF BITMAP IMAGES USING ERROR DIFFUSION

[75] Inventors: Robert E. Coward; James D. Parker, both of Rochester, N.Y.

[73] Assignee: Xerox Corporation, Stamford, Conn.

[21] Appl. No.: 895,063

[22] Filed: Jun. 8, 1992

[51] Int. Cl.$^5$ .............................................. G06K 9/36
[52] U.S. Cl. ...................... 358/455; 358/456; 358/457; 358/466; 348/390
[58] Field of Search ............... 358/455, 135, 136, 133, 358/140, 11, 138, 105, 466, 467, 456, 138; 375/27, 122, 118; 382/27, 41, 45, 46, 49

[56] References Cited

U.S. PATENT DOCUMENTS

| | | | |
|---|---|---|---|
| 4,651,287 | 3/1987 | Tsao | 364/519 |
| 4,654,721 | 3/1987 | Goertzel et al. | 358/283 |
| 4,668,995 | 5/1987 | Chen et al. | 358/282 |
| 4,691,233 | 9/1987 | Acampora | 358/136 |
| 4,700,226 | 10/1987 | Acampora | 358/136 |
| 4,706,260 | 11/1987 | Fedele et al. | 358/133 X |
| 4,742,553 | 5/1988 | Irwin | 382/47 |
| 4,783,838 | 11/1988 | Matsunawa | 382/51 |
| 4,811,239 | 3/1989 | Tsao | 364/519 |
| 4,891,714 | 1/1990 | Klees | 358/456 |
| 4,897,855 | 1/1990 | Acampora | 358/135 |
| 4,955,065 | 9/1990 | Ulichney | 382/50 |
| 4,999,705 | 3/1991 | Puri | 358/136 |
| 5,014,333 | 5/1991 | Miller et al. | 382/54 |
| 5,050,000 | 9/1991 | Ng | 358/298 |
| 5,051,844 | 9/1991 | Sullivan | 358/456 |
| 5,089,889 | 2/1992 | Sugiyama | 358/135 |
| 5,204,740 | 4/1993 | Ishii | 358/105 |
| 5,208,871 | 5/1993 | Eschbach | 358/466 X |
| 5,226,094 | 7/1993 | Eschbach | 382/41 |
| 5,253,059 | 10/1993 | Ansari et al. | 358/138 |

OTHER PUBLICATIONS

Floyd & Steinberg, "An Adaptive Algorithm for Spatial Greyscale", Proc. of the S.I.D. 17/2, 75-77 (1976).

*Primary Examiner*—Paul Ip
*Attorney, Agent, or Firm*—Thomas B. Zell

[57] ABSTRACT

In a method for converting from a first bitmap image resolution to a second bitmap resolution, be it interpolation (an increase in resolution) or decimation (a decrease in resolution) a bitmap image defined at resolution and density $I \times J \times a$ is prefiltered as a first step to ensure the preservation of original image structure and compensate for device dependence of the input image, which is necessary in order to maintain the quality and sharpness of the original image. The filter may be selected from a variety of filter choices and may also perform pixel interpolation or decimation depending on the input source. As a second step, unquantized scaling of a prefiltered image ($K \times L \times b$) is performed using an $f \times g$ pixel window to identify a set of neighboring input pixels surrounding a single output pixel. The window contributes input pixel density information to generate a scaled gray output pixel. Each pixel in the window is assigned a weighting factor to establish a density contribution to the output pixel. As a third step, each pixel in the gray scale image ($M \times N \times c$) is quantized to a desired depth using error diffusion or other quantizing methods. The gray scale image is converted from an image defined at c levels to an output image defined at d levels where each of the d levels can be reproduced by a selected output device.

19 Claims, 7 Drawing Sheets

UNQUANTIZED RESOLUTION CONVERSION OF BITMAP IMAGES USING ERROR DIFFUSION

CROSS REFERENCE

Cross reference is made to copending U.S. Patent application Ser. No. 07/513,415, entitled "Bit-Map Image Resolution Converter" assigned to the same assignee as the present invention.

BACKGROUND OF THE INVENTION

1. Field of the Invention

The present invention relates to digital image processing, and in particular, to a method of converting a bitmap image at a given input resolution to a desired output resolution while preserving the original image density and micro-structure detail.

2. Description of Prior Art

One method of representing image information at an image output terminal such as a printer or display is through image bitmaps. A bitmap is a matrix of pixels with the dimensions $I \times J \times a$ (width $\times$ length $\times$ depth). A pixel is a discrete unit of area identifiable by its position, with a value indicative of its density. Pixel resolution is the degree of detail used to represent an original image, which is measured using a scale of the unit area, I in one dimension and J in another (commonly expressed in spots per inch). Depth b of each pixel describes a gray density or intensity level from white, the absence of color, through black. Typically, a better approximation of an original image is achieved by increasing the pixel density and resolution of its digital representation.

Resolution conversion, i.e., converting a bitmap from first resolution $I \times J \times a$ to second resolution $M \times N \times d$, is an important interoperability enabler in distributed printing environments. Distributed environments may require a user to have the ability to create a digital image at one resolution and print, transfer or display at another resolution. Ideally, resolution conversion of bitmap images should appear fast and transparent to a user, while causing no image degradation.

Known methods of resolution conversion provide bit doubling of an original bitmap image, a simple scheme leaving a large number of problems unresolved. Among these problems are image erosion and dilation, which occur when images are optimized for write-white or write-black printers. Erosion occurs when images destined for write-black printers are sent to write-white printers resulting in thinner lines than desired. Another side effect of resolution conversion is halfbitting. Halfbitting optimizations occurs in lower resolution images in order to achieve a higher resolution effect at edges of images. Both halfbitting and erosion and dilation problems occur because bit doubling does not maintain the density of an image over a given area. As a result, artifacts are produced giving a resolution converted image a different appearance from an original.

Methods to convert gray images to binary or another number of levels while attempting to preserve the local density exist in applications separate from resolution conversion. These and similar methods might be applied as one part of the method in resolution conversion. One method, which can be used to prepare an image at a given resolution and level depth of $I \times J \times a$ for printing on a printer with resolution $M \times N \times d$, is error diffusion as described in "An Adaptive Algorithm for Spatial Greyscale," by Floyd and Steinberg, Proc. of the S.I.D. 17/2, 75-77 (1976) (hereinafter, "Floyd and Steinberg".

Current distributed environments require a greater degree of flexibility from resolution conversion schemes, as the following more recent advances teach.

U.S. Pat. No. 4,651,287 to Tsao and U.S. Pat. No. 4,811,239 to Tsao disclose a technique which uses an error diffusion algorithm to produce high quality images wherein the gray scale values are compared to the discrete gray scale values of a reference printed array to produce a corresponding error array. U.S. Pat. No. 4,668,995 to Chen et al. discloses a quantization error diffusion algorithm for transforming a multi-bit image into a binary image by diffusing a propagation error among neighboring blocks of pixels. U.S. Pat. No. 4,654,721 to Goertzel et al. suggests printing of gray data on a binary printer, where the gray data is normally of a lower resolution and one takes one gray pixel and transfers it into one 'dot', i.e. a number of binary pixels in the output. Goertzel determines the form and location of those dots using error diffusion and edge enhancement. U.S. Pat. No. 4,783,838 to Matsunawa discloses a multi-step technique which first divides the binary image into blocks of pixels in order to generate a gray-tone representation of the image. Image processing and enhancement can be performed on these blocks and the processed blocks are then converted to the output bitmap using a conventional threshold matrix. U.S. Pat. No. 4,742,553 to Irwin teaches mapping of similarly sized input and output pixel groups, and the use of an error passing process to account for thresholding errors in a resolution conversion process.

U.S. Pat. No. 5,051,844 to Sullivan relates to a method for digital halftoning of continuous tone images using error diffusion. The method reduces the appearance of worms by using a human visual system filter to propagate perceived error as opposed to mathematical error. U.S. Pat. No. 5,050,000 to Ng describes an error diffusion technique in which the gray level input data into halftone cells which are further subdivided. U.S. Pat. No. 5,014,333 to Miller et al. describes an image processing system with smooth transition between dither and diffusion processes, where an image processor measures the amount of high spatial frequency content of the local neighborhood around a pixel of interest. U.S. Pat. No. 4,955,065 to Ulichney relates to an image processing system for processing bits representing digitized images to produce images which perceptually approximate the continuous tone image with fewer undesirable artifacts. U.S. Pat. No. 4,891,714 to Klees describes a method of processing halftone images in which a calculated error is diffused to surrounding pixels before comparing with a predetermined threshold. U.S. Pat. No. 5,045,952 to Eschbach describes a method of improving image quality by dynamically adjusting the threshold of an error diffusion algorithm to selectively control the amount of edge enhancement introduced into a binary encoded output.

U.S. Patent application Ser. No. 07/513,415, entitled "Bit-Map Image Resolution Converter" assigned to the same assignee as the present invention, contemplates a method of magnifying, by a predetermined magnification factor (n), the original image pixels in two dimensions. U.S. Patent application Ser. No. 07/588,125, entitled "Bitmap Image Resolution Converter Compensating for Write-White Xerographic Laser Printing" assigned to the same assignee as the present invention, teaches conversion of binary images at a lower resolution to a higher resolution while compensating for image properties optimized for write-black destined for write-white printing systems. U.S. Patent application Ser. No. 07/600,542, entitled "Method for Making Image Conversions with Error Diffusion" assigned to the same assignee as the present invention, teaches conversion of an image by simulating printing of the image by creating a representation of a page at the particular resolution, scaling and orientation. The image is then periodically sampled through the page with an aperture that corresponds to the desired output, with error diffusion used in the quantization process. U.S. Patent application Ser. No. 07/737,297, entitled "Method of Resolution Conversion" assigned to the same assignee as the present invention. The method disclosed determines correlation values for a plurality of input pixels to obtain the intensity of the output pixels.

The pertinent portions of all references cited herein are incorporated by reference for their teachings.

SUMMARY OF THE INVENTION

In accordance with the invention, there is provided a method for converting from a first bitmap image resolution to a second bitmap resolution, be it interpolation (an increase in resolution) or decimation (a decrease in resolution). The method of resolution conversion is accomplished through a three step process ensuring a high degree of image quality by optimizing for particular input and output environments.

In accordance with one aspect of the invention, a bitmap image defined at resolution $I \times J \times a$ is prefiltered as a first step to generate an image with resolution and density defined at $K \times L \times b$, which ensures the preservation of original image structure necessary in order to maintain the quality and sharpness of the original image. Original image structure is preserved for example by capturing half-bitted image information and preserving it as gray density information. The filter may be selected from a variety of filter choices and may perform pixel interpolation or decimation depending on the input source and output device. Following the first step, unquantized scaling of prefiltered image ($K \times L \times b$) is performed using an $f \times g$ pixel window to identify a set of neighboring input pixels surrounding a single output pixel. Each pixel in the window contributes input pixel density information to generate a scaled gray output pixel. Also, each pixel in the window is assigned a weighting factor to establish a density contribution to the output pixel. Finally, each pixel in the gray scaled image ($M \times N \times c$) is quantized to a desired depth using error diffusion or other quantizing methods such as halftoning. The gray scale image ($M \times N \times c$), in effect, is converted from an image defined with pixel depth c to an output image defined with pixel depth d where depth d can be reproduced by a selected output device.

In accordance with another aspect of the invention, there is provided a method of image conversion, for converting an original image having a bitmap of pixels defined along x- and y- axes and at a resolution of K pixels per unit length along the x-axis $\times$ L pixels per unit length along the y-axis ($K \times L$) and pixel depth b, to a second image having M pixels per unit length along the x-axis $\times$ N pixels per unit length along the y-axis ($M \times N$) and pixel depth d, comprising the steps of: directing an input image including a number of input pixels defined at resolution $K \times L$ through a filter to produce an image including a number of output pixels defined at $M \times N$; determining, for each output pixel in the image defined at resolution $M \times N$, a gray level value having pixel depth c as a function of a predefined neighborhood of overlapped and non-overlapped input pixels about the output pixel, each input pixel in the neighborhood contributing to the gray level determination in accordance with a precalculated weight based on position in the neighborhood of the input pixel with respect to the output pixel; and quantizing the gray level value of each output pixel having pixel depth c to a depth d suitable for output, while retaining local area density over the image at resolution $M \times N$.

An advantage of the inventive method is modularity of the process. For example, if an input source originally optimized for a write-white printer is converted to produce output destined for a write-black printer, only a portion of the method would require modification to produce the desired write-black output. Other standard techniques may be added such as image cleaning of halfbitted images, or filters to scale images in order to avoid crossing multiple resolution boundaries, Filter designs are tailored to particular input sources by choosing appropriate filters. Depending on the attributes of the input source, filters may preform mild pixel interpolation on the image while scaling it to insure sufficient data in order to perform accurate resolution conversion. Sufficient data is paramount in order to suppress the negative effects of beat frequencies inherent in resolution scale changes, which is the reason density information is preserved throughout the resolution conversion process.

Gray scale indicates that the pixel value is neither black nor white but typically one of a set of gray values, white being the least gray and black being the most gray. Because a natural periodicity exists between the $f \times g$ pixel window and the output pixels, the filter matrix needs to be calculated only once per image. Filter weights are calculated using a weight function best suited for a given application. Common weight functions are linear and COSINE. Using the calculated weight matrix, a gray scale image is created at a new resolution.

The final step quantizes input from the previous step in order that the output image has the correct number of gray levels. The quantizer performs thresholding, error diffusion or halftoning, which resolves any errors introduced during the second step. Errors are introduced due to differences of pixel frequency and gray level at the input and output resolutions.

In summary, resolution conversion is accomplished on an image by first preparing it for unquantized resolution conversion, performing resolution conversion on it, and finally quantizing it.

These and other aspects of the invention will become apparent from the following descriptions to illustrate a preferred embodiment of the invention read in conjunction with the accompanying drawings in which:

While the present invention will hereinafter be described in connection with an embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
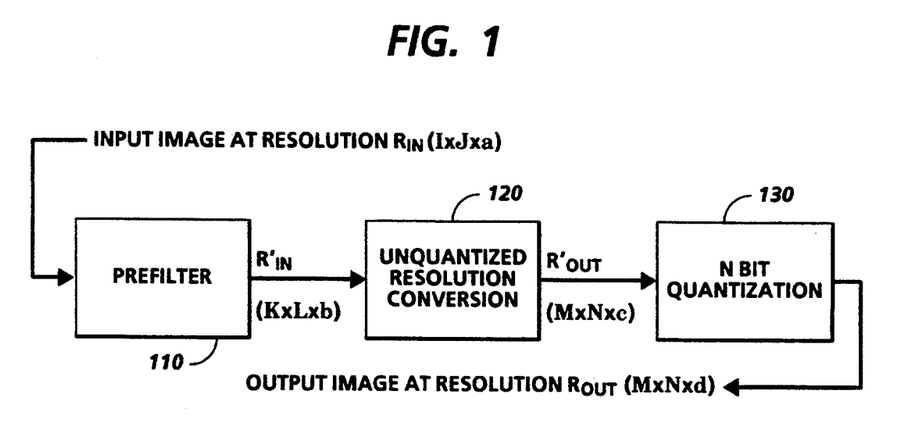
FIG. 1 is an overview of a basic system for carrying out the invention.

For a general understanding of the features of the present invention, references are made to the drawings. FIG. 1 describes in general terms the present invention. The purpose of the multi-step process presented in FIG. 1 is to manipulate an input image by altering its resolution to a desired output resolution, while preserving image quality and optical density.

At prefilter 110 a selection is made between three different filters, depending on input image characteristics of input resolution $R_{in}$ (I×J ×a) and output image specifications of output resolution $R_{out}$ (M×N×d). Each filter has tradeoffs considered during selection. For example, environmental independence, whether the filter is unaffected by output devices that are write-white or write-black, is considered. Each filter is selected with the intention of preserving the image's micro-structure, since the micro-structure constitutes the sharpness and quality of an image.

At resolution conversion 120, image $R'_{in}$ (K×L×b) is scaled without quantizing, to a desired resolution to produce image $R'_{out}$ (M×N×c), a gray representation of final output image $R_{out}$ (M×N×d). Input image $R'_{in}$ may be binary or gray (where binary is just one level of gray, black or white), meaning there are one or several bits of information describing the density of any particular pixel. Once again, the reason for producing gray scale information at output $R'_{out}$ is to pass along to the next step the most accurate gray density measurement of an image in order that more accurate quantization results.

Quantizer 130 quantizes input $R'_{out}$ using an error diffusion method to render output $R_{out}$. The quantization technique is applied as the last step in order to preserve as much original input image data as possible throughout the conversion process, maximizing image quality.

Figure 2:
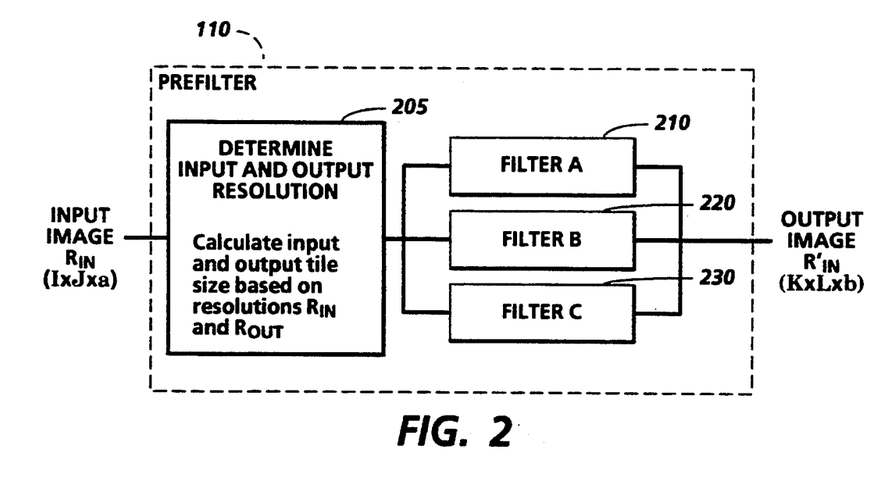
FIG. 2 is a detailed illustration of the first step of the system representing 110 in FIG. 1.

With reference now to FIG. 2, based on known input resolution $R_{in}$ and desired output resolution $R_{out}$, input and output tile sizes are calculated at step 205. Input image $R_{in}$ (I×J×a), which can have either a binary or gray value, is processed by prefilter 110 resulting in image $R'_{in}$ (K×L×b). Prefilter 110 may be made up of any number of filters, however, for illustration of this embodiment, three filters 210, 220 and 230 are selected. Each filter 210, 220 or 230 has different characteristics, e.g. performing mild pixel interpolation or image smoothing, etc. In the described embodiment, each filter, however, scales the input image by two in both the fast and slow scan directions using known techniques such as the mapping technique described in U.S. Pat. No. 4,742,553 to Irwin which teaches mapping of similarly sized input and output pixel groups.

In one desirable embodiment, at least one filter such as filter 210 does not interpolate the image and is environmentally independent. Environment independence means the output may be directed to either a write-white or write-black printer. Because pixel interpolation is not performed (no image quality decisions are made), filter 210 is the fastest of filters 210, 220 and 230, while completely preserving the micro-structure of the image. Filter 210 has an output $R'_{in}$ that is twice the scale of input image $R_{in}$.

Second filter 220 is device dependent and may be adjusted for a type of output device, e.g. write-white or write-black xerographic devices. For example, the method described in U.S. Patent application Ser. No. 07/588,125, is an interpolation scheme optimized for converting write black data, destined for write-white printers, while smoothing. The smoothing eliminates half-bitten edges which might appear on characters, and, as previously mentioned filter 220 doubles the scale of the input image $R_{in}$.

Third filter 230 also interpolates and mildly smooths ragged edges and corners (jaggies), and is not environmentally dependent while doubling the scale of the input image $R_{in}$. The filter maintains a sufficient amount of image micro-structure to act as a quality prefilter, by preserving it, for example, as additional gray density information.

Figure 3:
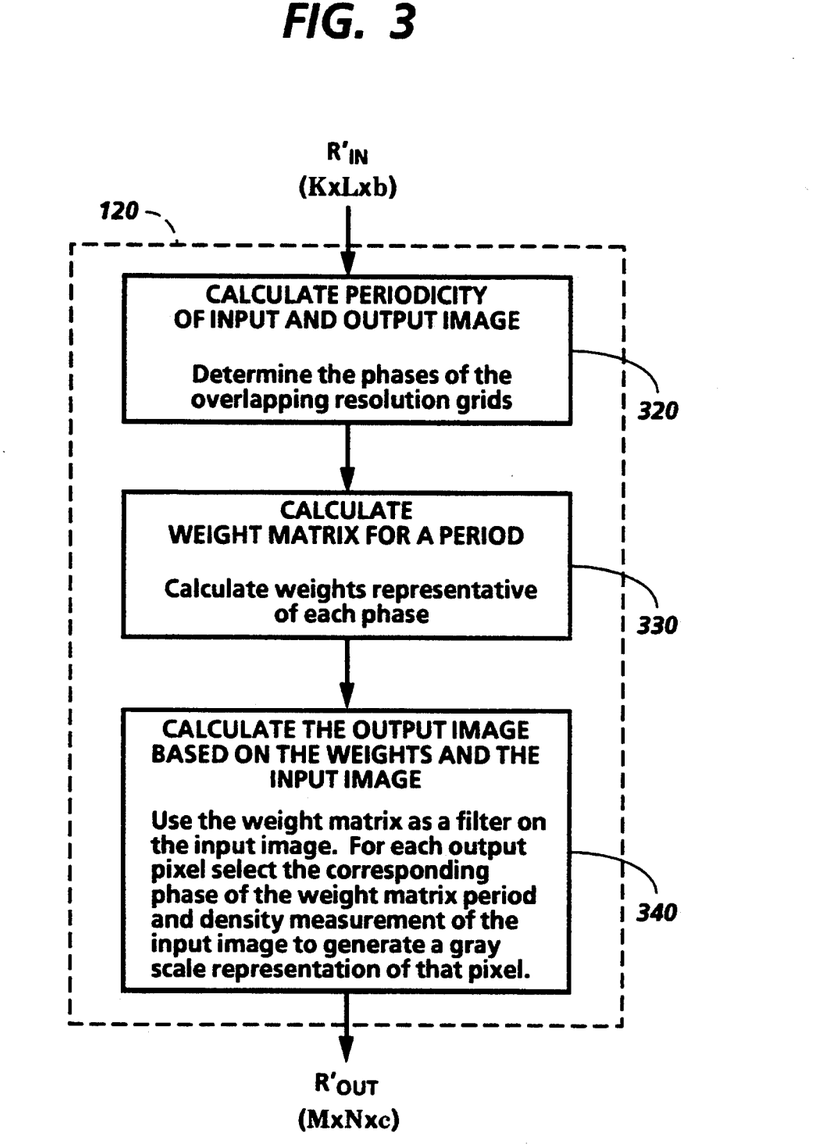
FIG. 3 is a flow diagram representing the second step 120 in FIG. 1.

With reference now to FIGS. 1 and 3, a basic summary flow diagram of the function of resolution converter 120 is shown in FIG. 3. At step 320, phases of the input and output tiles are determined for one period. The input and output tiles have a periodic nature, where each phase within a period describes a repeating property. At step 330, a weighting matrix of each phase in the period is formed. At step 340, a determination of the value of each gray output pixel based on the weights and input image is made.

For the purpose of illustrating an example of the resolution conversion method, a symmetric linear combination resolution method using an input resolution of K×L, where K=L=300 spi (spots per inch) and an output resolution of M×N, where M=N=400 spi are selected. It will be appreciated by those skilled in the art that other resolution methods such as COSINE as well as the symmetric linear combination method, may have input and output resolutions with symmetric properties where K, M=L, N or asymmetric properties where K, M≠L, N that are derived in a similar manner. In general and with specific reference to the example, the input and output tile size are calculated using the greatest common divisor (GCD) between the input and output resolution.

Figure 4:
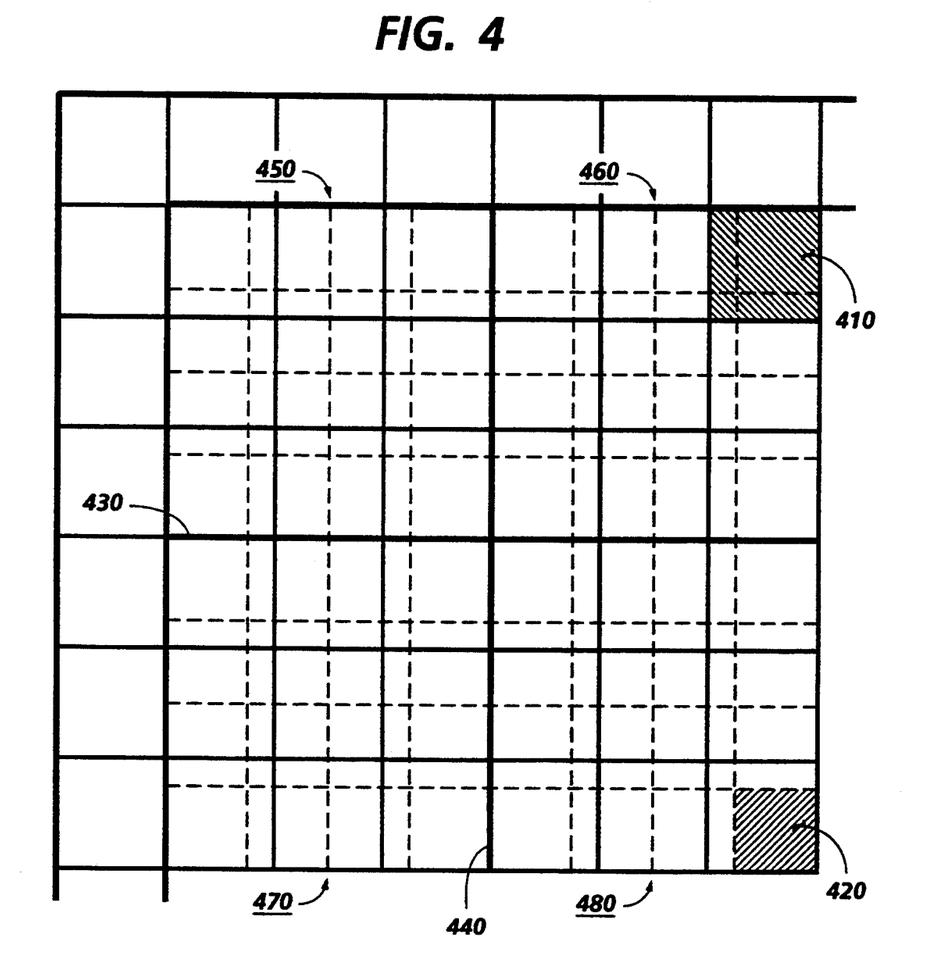
FIG. 4 is an illustrative example of an input-output grid overlay for the four upper left-most tiles of an image.

$C = GCD(K,M)$
$\quad = GCD(300,400) = 100$
Using C, the input and output tile sizes are determined:
input tile size $= (K/C + 2) \times (L/C + 2)$
$\quad = (300/100 + 2) \times (300/100 + 2) = 5 \times 5$
output tile size $= (M/C) \times (N/C)$
$\quad = (400/100) \times (400/100) = 4 \times 4$ With reference now to FIG. 4, an input-output grid overlay for the four upper left-most tiles of an image with input resolution 300×300 spi (with pixels indicated as 410) and output resolution 400×400 spi (with pixels indicated as 420), where corresponding relative pixel size, is shown. The center dark crossing lines 430 and 440 which divide four periods 450, 460, 470 and 480 of the input and output tiles, show the periodic nature of the input and output image, i.e., given a pixel 410 at a known location in the tile, the overlay arrangement of pixels 420 is always the same. From this, it may be concluded that the contribution of given pixels 410 to the density of given pixel 420 are the same between periods.

Figure 5:
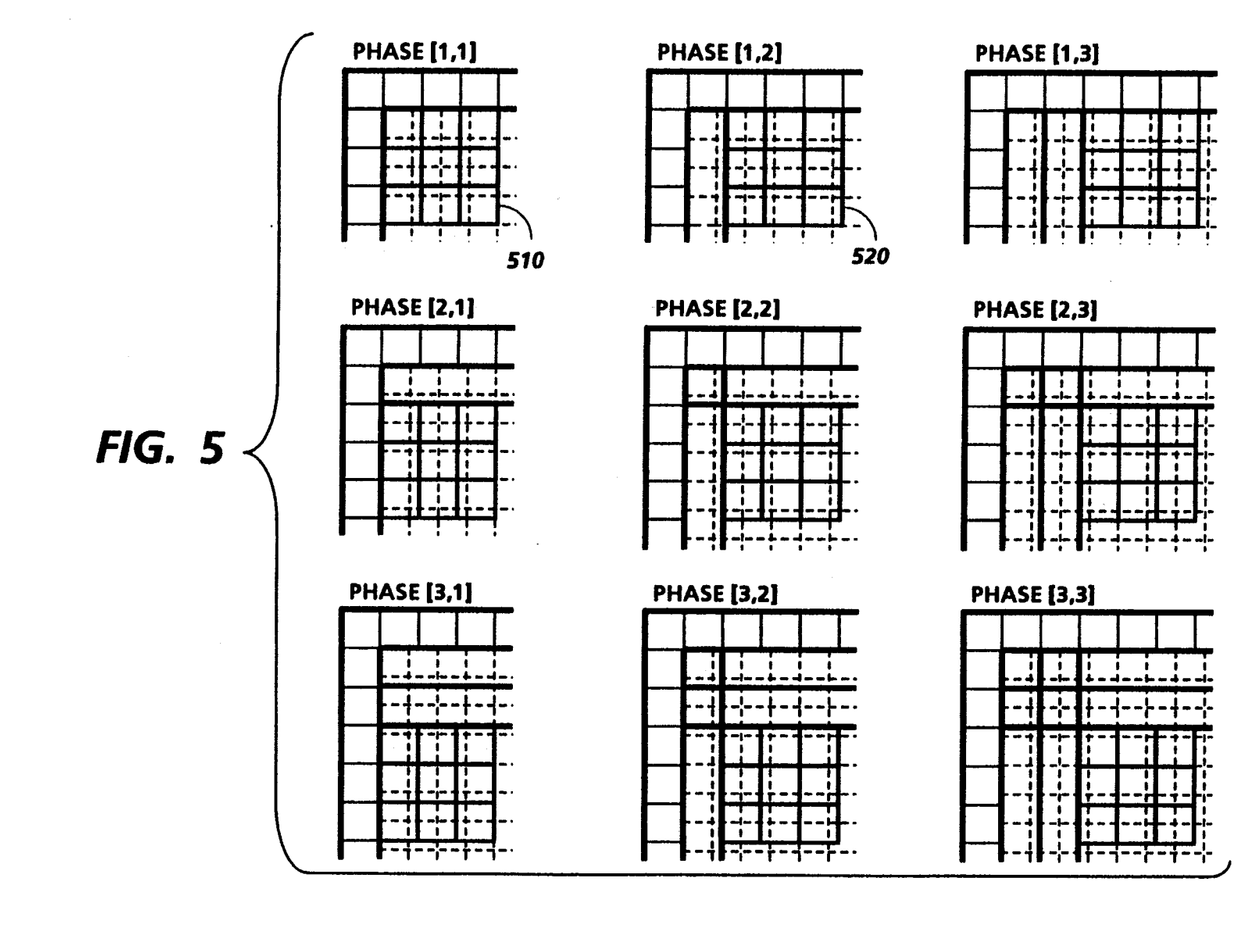
FIG. 5 is an illustrative example of different phases that exist for one period of an input-output grid overlay.

With reference now to FIG. 5, all phases corresponding to one tile 450 shown in FIG. 4 are explicitly shown in FIG. 5. Tile 450 in FIG. 4 (the upper left corner of the image) has nine phases, making up a period for one overlay input-output grid. With reference to FIG. 5, the input grids (complete lines) overlay the output grids (dotted lines). The first phase 510 of the period moves by one input pixel to the right to create the next phase 520. All subsequent phases are created by either moving to the right or moving down by one input pixel from a previous phase.

Given the period of input to output grid, a filter weight matrix for the image may be calculated. In the described embodiment, the input to output grid is periodic. The filter weight matrix, a series of weights or factors which are applied to determine the gray value of any output pixel, must only be calculated once per image since they are the same for each period (assuming a single resolution conversion). In the described embodiment, the weights are proportional to the inverse of the distance between the center of the output pixel and each of the centers of the nine input pixels, Alternate embodiments may add blue noise to image $R'_{out}$ by pseudo randomly shifting the weights of the filter matrix, which in turn increases the number of gray levels of image $R'_{out}$. Weights W for each output pixel in a period are calculated as follows:

$$W(X_{in}, Y_{in}, X_{out}, Y_{out}) = \{D/(\text{SUM}_{A=1 \text{ to } f} \text{SUM}_{B=1 \text{ to } g}[D_{AB}])\}^{-1}$$

where

D = the distance from $P_{in}(X_{in}, Y_{in})$ to $P_{out}(X_{out}, Y_{out})$ $\text{SUM}_{A=1 \text{ to } f} \text{SUM}_{B=1 \text{ to } g}$ = all possible abscissa and ordinate values for an $f \times g$ interpolation grid.

Figure 6:
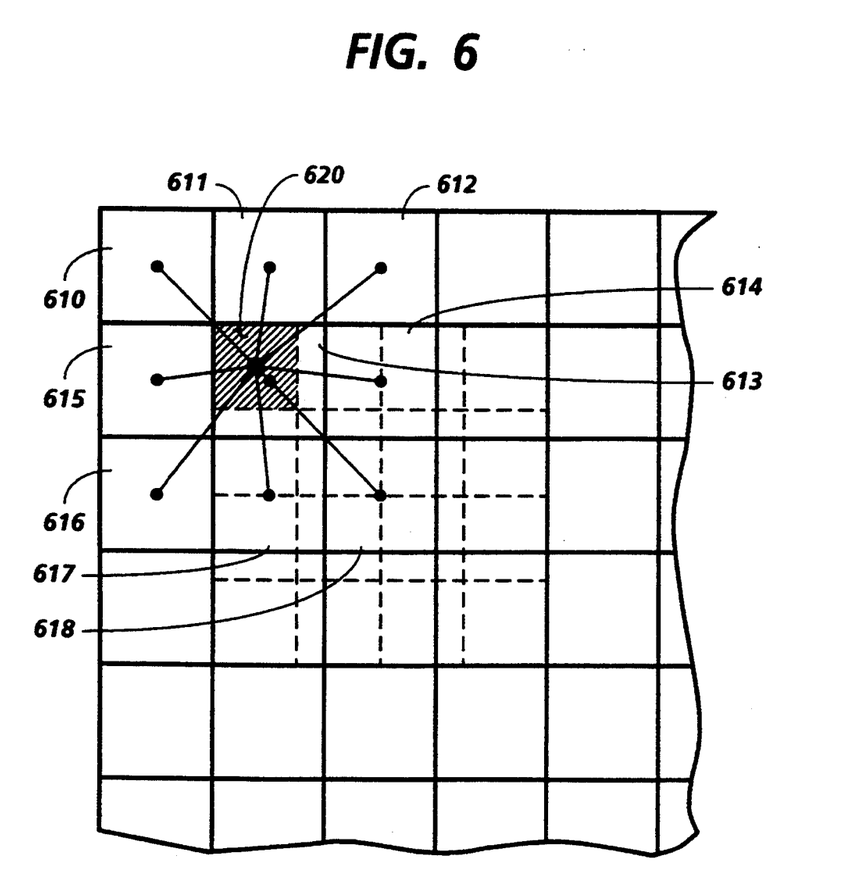
FIG. 6 is an illustrative example of a 3×3 input pixel neighborhood surrounding one output pixel.

The weights are used in association with an f×g interpolation grid to identify a set of neighboring pixels contributing information to a scaled output pixel value. In one embodiment, a 3×3 neighborhood of pixels is used as an interpolation window, as shown in FIG. 6. Note that any f×g symmetrical or asymmetrical neighborhood size may be used, and that it has no relation to the input or output resolutions. The window or neighborhood includes both overlapped pixels (one or more input pixels having common area with an output pixel) and non-overlapped pixels (one or more input pixels having no common area with an output pixel). Non-overlapped input pixels should contribute to an output pixel value for the following reasons: non-overlapped input pixels help increase the number of gray levels in $R'_{out}$; non-overlapped $R'_{in}$ pixels to $R'_{out}$ pixels balances the "surrounding context"; non-overlapped pixels act like a prediction for projection type interpretive methods; and in the case of decimation, non-overlap is required to insure smoother transitions between adjacent $R'_{out}$ pixels and tiles. FIG. 6 illustrates how the output value for a single output pixel (square) 620 ($P_{out}(X_{out}, Y_{out})$) is determined using a window of interpolation input pixels (circles) 610 . . . 618 ($P_{in}(X_{in}, Y_{in})$) each having a weighted pixel value contributing to the output pixel value. In this case, the predefined neighborhood of overlapped and non-overlapped input pixels includes the nine input pixels nearest to the output pixel. Values for output pixels are determined as follows:

$$P_{out}(X_{out}, Y_{out}) = \text{SUM}_{X_{in}=1 \text{ to } f} \text{SUM}_{Y_{in}=1 \text{ to } g}[W(X_{out}, Y_{out}, X_{in}, Y_{in}) P_{in}(X_{in}, Y_{in})]$$

where $X_{in}$ = 1 to f are f abscissa values for X in an $f \times g$ interpolation grid.

$Y_{in}$ = 1 to g are g ordinate values for Y in an $f \times g$ interpolation grid.

$P_{out}(X_{out}, Y_{out})$ = value of the output pixel at location ($X_{out}, Y_{out}$).

$P_{in}(X_{in}, Y_{in})$ = value of input pixel at location ($X_{in}, Y_{in}$).

$W(X_{in}, Y_{in}, X_{out}, Y_{out})$ = weight for pixel $P_{in}(X_{in}, Y_{in})$ when applied to output pixel $P_{out}(X_{out}, Y_{out})$.

Figure 7:
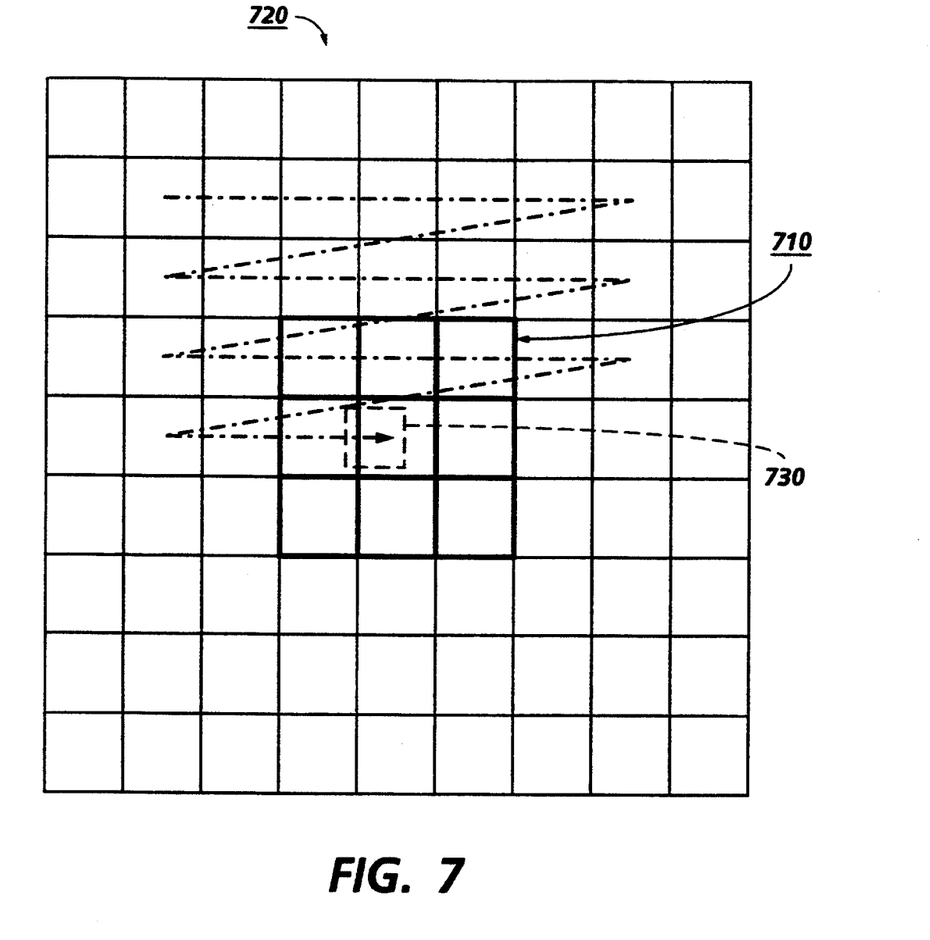
FIG. 7 illustrates the manner in which a 3×3 interpolation window moves through an input image.
Figure 8A:
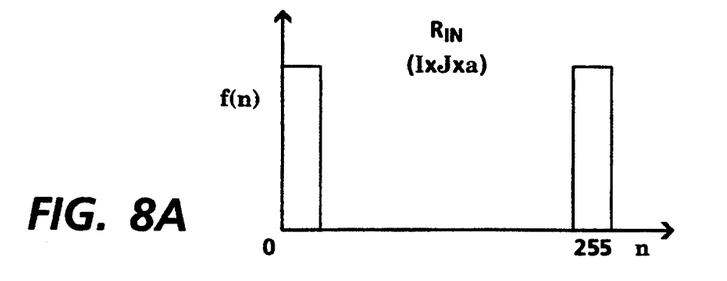
FIGS. 8A, 8B, 8C and 8D illustrate an example of image pixel density propagating through the basic system.
Figure 8B:
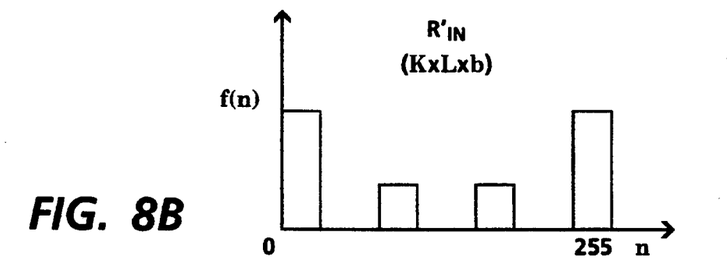
Figure 8C:
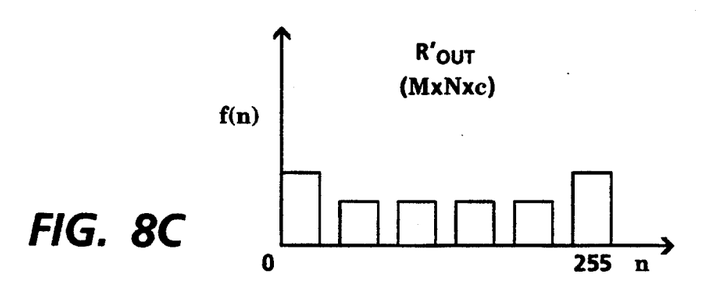
Figure 8D:
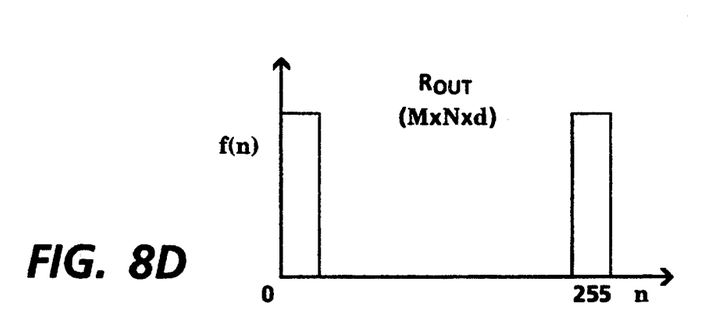

FIG. 7 illustrates the manner in which a 3×3 interpolation window 710 moves through an input image 720 (at 300 spi). As FIG. 7 indicates, 3×3 window 710 moves one output pixel (current output pixel 730 being interpreted) at a time from left to right and as the end of the line is reached, the window retraces by dropping down a row of pixels and starting at the beginning of the next output line. In this manner all output pixels are calculated. The value of output pixel 730 is found using a weighted linear combination of the values of the nine input pixels in 3×3 neighborhood 710.

At this point, it is of interest to note that an anamorphic (an image with extended fast scan addressability e.g. 400×1200 spi) linear combination resolution conversion method is an extension of the symmetric method described. Also note, intermediate output $R'_{in}$ of step one could add gray density information as does intermediate output $R'_{out}$. Using a series of histograms FIG. 8 illustrates how density information of a particular input image $R_{in}$ is preserved while it propagates through the resolution conversion process to output image $R_{out}$. Histograms 8A, 8B, 8C and 8D represent the number of pixels with specific density n over a gray scale range having intensity values from 0 to 255 (where 0 is white and 255 is black) as a function of f for respective images $R_{in}$, $R'_{in}$, $R'_{out}$ and $R_{out}$. Histogram 8A shows $R_{in}$ as a binary input image since density information of the image is clustered around values 0 and 255. Histogram 8B adds a few density levels to account for example for half-bitting in image $R_{in}$. Histogram 8C makes better use of the density range available as a result of unquantized resolution conversion. Finally histogram 8D shows a final binary image suitable for an output device that requires gray image $R'_{out}$ is quantized to a binary image.

Step 130 shown in FIG. 1 quantizes image $R'_{out}$ (M×N×c) using error diffusion, generating the final output image $R_{out}$ (M×N×d). Methods to quantize gray images to binary or a fewer number of levels while attempting to preserve the local density and sharpness exist, and include among them error diffusion, as taught, for example, in Floyd and Steinberg. Another, more elaborate method would be the error diffusion techniques of U.S. Pat. No. 5,045,952 to Eschbach, which serves to provide image dependent edge enhancement, both of which are incorporated herein by reference.

In summary, the embodiment described is one of several methods to convert the resolution of an image in a modular manner while preserving its micro-structure and density. The method divides resolution conversion into three steps, filtering, scaling and quantizing, in order to achieve a high degree of image quality of the converted image. The image quality achieved is dependent on the output requirements for a given input source. Thus, the quality of the output is dependent on how well the method described is tailored to a specific environment. As it will be appreciated by one skilled in the art, the method described herein is one of many, environmentally dependent embodiments.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of image conversion, for converting an original bitmap image having a bitmap of pixels defined along x- and y-axes and at a resolution of I pixels per unit length along the x-axis×J pixels per unit length along the y-axis (I×J) and pixel depth a, to an output image having M pixels per unit length along the x-axis x, N pixels per unit length along the y-axis (M×N) and pixel depth d, comprising the steps of:

directing the original bitmap image including a number of input pixels defined at resolution I×J×a through a filter to produce a second bitmap image including a number of output pixels defined at a resolution of K pixels per unit length along the x-axis×L pixels per unit length along the y-axis (K×L) and pixel depth b;

determining, for each pixel in the output image defined at resolution M×N, a gray level value having pixel depth c as a function of a predefined periodically repeating neighborhood of overlapped and nonoverlapped input pixels about each output pixel, each input pixel, defined by the second bitmap image at resolution K×L×b, in the periodically repeating neighborhood contributing to the gray level determination in accordance with a precalculated weight based on position in the periodically repeating neighborhood of each input pixel with respect to each output pixel; and quantizing the gray level value of each pixel of the output image having pixel depth c to depth d, while retaining local area density and sharpness over the image at resolution M×N.

2. The method as defined in claim 1, wherein the filter is selected in accordance with input image characteristics and output image specifications.

3. The method as defined in claim 2 wherein said input image characteristic is an output type for which the image is optimized.

4. The method as defined in claim 3 wherein said output image characteristic is an output type for which the image is not optimized.

5. The method as defined in claim 1 wherein the predefined neighborhood of overlapped and non-overlapped input pixels includes the neighboring input pixels nearest to the output pixel.

6. The method as defined in claim 1 wherein the precalculated filter weight is a function of the distance from the center of the input pixel to the center of the output pixel.

7. The method as defined in claim 1 wherein the quantization of the gray level value of each output pixel having pixel depth c to a depth d suitable for output is at least partially a function of quantization of previously processed output pixels, within a predetermined distance from the output pixel.

8. A method of image conversion, for converting an original image having a bitmap of pixels defined along x- and y-axes and at a resolution of K pixels per unit length along the x-axis×L pixels per unit length along the y-axis (K×L) and pixel depth b, to an output image having M pixels per unit length along the x-axis×N pixels per unit length along the y-axis (M×N) and pixel depth c, comprising the steps of:

determining, for each pixel in the output image defined at resolution M×N, a gray level value having pixel depth c as a function of a predefined periodically repeating neighborhood of overlapped and non-overlapped input pixels about each output pixel defined at resolution K×L, each input pixel in the periodically repeating neighborhood contributing to the gray level determination in accordance with a precalculated weight based on position in the periodically repeating neighborhood of each input pixel with respect to each output pixel.

9. The method as defined in claim 8 wherein the predefined neighborhood of overlapped and non-overlapped input pixels includes the neighboring input pixels nearest to the output pixel.

10. The method as defined in claim 8 wherein the precalculated weight based is a function of the distance from the center of the input pixel to the center of the output pixel.

11. The method as defined in claim 8 wherein the quantization of the gray level value of each output pixel having pixel depth n to a depth m suitable for output is at least partially a function of quantization of previously processed output pixels, within a predetermined distance from the output pixel.

12. An apparatus for converting an original image at a first resolution and pixel depth to a second resolution and pixel depth, distinct from the first, comprising:

an image input receiving a bitmap of pixels defined along x- and y-axes at a resolution of I pixels per unit length along the x-axis×J pixels per unit length along the y-axis (1×j) and pixel depth a;

filter means for processing the image to produce a number of output pixels defined at K pixels per unit length along the x-axis s L pixels per unit length along the y-axis (K×L) and pixel depth b;

interpolation means, for determining, for each output pixel in the image defined at resolution M×N, a gray level value having pixel depth c as a function of a predefined periodically repeating neighborhood of overlapped and non-overlapped input pixels defined at resolution K×L×b about the output pixel, each input pixel in the periodically repeating neighborhood contributing to the gray level determination in accordance with a precalculated weight based on a position in the neighborhood of the input pixel with respect to the output pixel;

quantizing means for quantizing the gray level value of each output pixel having pixel depth c to a depth d suitable for output, while retaining local area density over the image at resolution M×N; and an image output.

13. The apparatus of claim 12, wherein the predefined periodically repeating neighborhood of overlapped and non-overlapped input pixels includes neighboring input pixels nearest to the output pixel.

14. The apparatus of claim 12, wherein the precalculated weight is a function of the distance from an input pixel to an output pixel.

15. The apparatus of claim 12, wherein said quantizing means performs error diffusion.

16. A method for converting an input image including a number of input pixels defined at resolution $K \times L$ to an output image including a number of output pixels defined at resolution $M \times N$, comprising the steps of:

calculating an input tile size in accordance with the input image resolution and an output tile size in accordance with the output image resolution, the input tile size defining an input tile and output tile size defining an output tile, both the input tile and the output tile being dimensionally equal and being dimensionally smaller than the input image and output image;

overlaying the input tile with the output tile to define an input output grid having a plurality of phases, each phase of the input-output grid defining a periodically repeating neighborhood of overlapped and nonoverlapped input pixels about each output pixel, said overlaying step identifying a position for each output pixel in the input-output grid of the periodically repeating neighborhood of overlapped and non-overlapped input pixels;

determining a gray level value having depth c for each output pixel defined at resolution $M \times N$, each input pixel defined at resolution $K \times L$ and depth b in the periodically repeating neighborhood contributing to a gray level determination of each output pixel in the output image in accordance with a precalculated weight based on position in the periodically repeating neighborhood of each input pixel with respect to each output pixel; and quantizing the gray level value of each output pixel having pixel depth c to depth d, while retaining local area density and sharpness over the image at resolution $M \times N$.

17. The method of claim 16, wherein said calculating step calculates the input tile size and the output tile size in accordance with the following equations:

$$C = Greatest\ Common\ Divisor(K,M);$$

$$input\ tile\ size = (k/c+2) \times (l/c+2);\ and$$

$$output\ tile\ size = (M/c) \times (N/c).$$

18. The method of claim 16, wherein said determining step includes the step of defining a weight as proportional to the inverse of the distance between an output pixel and each input pixel surrounding the output pixel.

19. The method of claim 18, wherein said determining step includes the step of precalculating a weight in accordance with the following equation:

$$W(X_{in}, Y_{in}, X_{out}, Y_{out}) = \{D/(\text{SUM}_{A=1\ to\ f} \text{SUM}_{B=1\ to\ g}[D_{AB}])\}^{-1}$$

where
$D =$ the distance from $P_{in}(X_{in}, Y_{in})$ to $P_{out}(X_{out}, Y_{out})$;
$\text{SUM}_{A=1\ to\ f} \text{SUM}_{B=1\ to\ g} =$ all possible abscissa and ordinate values for an $f \times g$ interpolation grid.

* * * * *